United States Patent
Levy et al.

(10) Patent No.: US 11,093,987 B2
(45) Date of Patent: Aug. 17, 2021

(54) SYSTEM AND METHOD FOR PROVIDING DATA FOR ON-LINE PRODUCT CATALOGUES

(75) Inventors: Michael Levy, Dallas, TX (US); Marcus Slagle, West Chester, OH (US); Chris Jacobson, Cincinnati, OH (US); John Knodel, Cincinnati, OH (US)

(73) Assignee: WHAPPS LLC, Dallas, TX (US)

( * ) Notice: Subject to any disclaimer, the term of this patent is extended or adjusted under 35 U.S.C. 154(b) by 1873 days.

(21) Appl. No.: 11/822,144

(22) Filed: Jul. 2, 2007

(65) Prior Publication Data
US 2008/0040220 A1     Feb. 14, 2008

Related U.S. Application Data

(60) Provisional application No. 60/817,416, filed on Jun. 30, 2006.

(51) Int. Cl.
*G06Q 30/06*      (2012.01)
*G06Q 30/02*      (2012.01)

(52) U.S. Cl.
CPC ..... *G06Q 30/0603* (2013.01); *G06Q 30/0226* (2013.01); *G06Q 30/0601* (2013.01)

(58) Field of Classification Search
CPC ........... G06Q 30/0241; G06Q 30/0603; G06Q 30/0226; G06Q 30/0601
USPC .................................................. 705/14, 14.4
See application file for complete search history.

(56) References Cited

U.S. PATENT DOCUMENTS

| | | | |
|---|---|---|---|
| 6,515,681 B1* | 2/2003 | Knight | G06Q 10/107 707/999.003 |
| 6,834,287 B1* | 12/2004 | Folk-Williams et al. | |
| 7,035,817 B1* | 4/2006 | Brothers | 705/51 |
| 2002/0116243 A1* | 8/2002 | Mancisidor et al. | 705/7 |
| 2002/0120497 A1* | 8/2002 | King | 705/14 |
| 2002/0194181 A1* | 12/2002 | Wachtel | G06F 16/972 |
| 2004/0054569 A1* | 3/2004 | Pombo | G06Q 30/0601 705/7.27 |
| 2004/0143600 A1* | 7/2004 | Musgrove et al. | 707/104.1 |
| 2004/0243468 A1* | 12/2004 | Cohagan et al. | 705/14 |
| 2005/0144026 A1* | 6/2005 | Bennett | G16H 20/10 714/2 |

(Continued)

OTHER PUBLICATIONS

Online-Rewards, https://web.archive.org/web/20050429024930/http://www.onilne-rewards.com/technology.htm, Apr. 29, 2005.

(Continued)

*Primary Examiner* — Mario C. Iosif
(74) *Attorney, Agent, or Firm* — Jones Day

(57) ABSTRACT

The present invention relates particularly to a system and method for providing product data for use in on-line product catalogs used for promotional schemes, such as loyalty and incentive schemes. Loyalty and incentive systems are well known, where participants gain virtual currency which they can use to purchase goods or services. The present invention enables a plurality of on-line catalogs to be constructed from a stream of supplier data. Selection criteria are used to select product data from the supplier data to go in each catalog. The product data can be updated in real time for each catalog on the basis of the selection criteria.

12 Claims, 8 Drawing Sheets

(56) References Cited

U.S. PATENT DOCUMENTS

2007/0073704 A1* 3/2007 Bowden .............. G06F 16/9535
2008/0140779 A1* 6/2008 Ahn ...................... G06Q 10/06
709/205

OTHER PUBLICATIONS

Online-Rewards, https://web.archive.org/web/20050002232354/online-rewards.com/rewards.htm, Jun. 2, 2005.
Online-Rewards, https://web.archive.org/web/20050603032301/http://www.online-rewards.com/programs.htm, Jun. 3, 2005.
Online-Rewards, https://web.archive.org/web/20050317190534/http://www.online-rewards.com.80/technology.htm, Aug. 17, 2005.
Online-Rewards, https://web.archive.org/web/20040926030323/online-rewards.com/rewards.htm, Sep. 26, 2014.

* cited by examiner

SYSTEM AND METHOD FOR PROVIDING DATA FOR ON-LINE PRODUCT CATALOGUES

REFERENCE TO RELATED APPLICATION

This application claims the benefit of priority of U.S. Provisional application of 60/817,416, filed 30 Jun. 2006, which designates the United States and was published in English. This application, in its entirety, is incorporated herein by reference.

FIELD OF THE INVENTION

The present invention relates to a system and method for providing product data for use in product catalogs, and, particularly, but not exclusively, to a system and method for providing product data for on-line catalogs for use in loyalty and/or incentive programs.

BACKGROUND OF THE INVENTION

Loyalty and incentive programs are well known, where participants gain virtual currency (usually in the form of "points") in response to certain behavior (e.g. patronage of a particular airline, use of a particular brand of credit card, achievement of a particular workplace goal, years of service at a company, etc.). Participants may exchange their virtual currency for various goods and/or services ("products"), access to which is provided by a scheme promoter (e.g. airline, incentive scheme promoter, credit cards scheme promoter, employer etc.).

It is known to provide on-line access to product catalogs from which a user subscribing to a particular incentive/loyalty scheme may select products to purchase in exchange for their virtual currency (in some schemes the user may also provide actual currency in addition to the virtual currency in order to make up the value of a particular desired product and complete a redemption transaction). Known on-line catalogs are essentially "static", offering a fixed range of products, updates being made to the catalog only infrequently. This is similar to known off-line (hard copy) catalogs which have been known for a very long time, and which are updated infrequently and offer a fairly fixed range of products. Limitations of these types of catalogs include: fixed pricing, restricted product selections, inability to keep catalogs up to date and refreshed, reduced value of products or services and limited catalog product options. A further problem with known catalogs is that to keep the catalogs updated is a labour intensive process for the scheme promoter or client and can be expensive.

SUMMARY OF THE INVENTION

In accordance with a first aspect, the present invention provides a system for providing product data for use in an on-line product catalog, the system including a receiver arranged to receive product provider data from a product provider system, and a selector for selecting product data from the product provider data, for including in the on-line product catalog.

In an embodiment the receiver is arranged to receive product provider data from a plurality of product provider systems.

By "on-line" is meant that the product catalog can be accessed over any telecommunications or computer network. This includes, but is not limited to, the Internet, the Web, mobile based communications (e.g. GPRS, or any other mobile based telecommunications network).

An advantage of at least an embodiment of the invention is that products from different product providers (e.g. product manufacturers, suppliers and product aggregators, etc) may be sourced, preferably over a network from the product provider's computing systems, and a selection of products provided to the on-line product catalog. The catalog may therefore include a unique subset of products which are aggregated from several different sources.

Note that the term "products" includes goods and/or services.

In an embodiment, the selector is arranged to select product data in accordance with selection criteria. The selection criteria may include price of product, availability of product, popularity of product (e.g. top 200 movies), the particular season (e.g. clothing season), geography (e.g. country/location of the catalog), consumer rating of a product, value of a product (e.g. most heavily discounted products or services), best selling products or services, and other criteria. A catalog can therefore be constructed on the basis of selection criteria as required by any promoter of incentive and/or loyalty schemes. In an embodiment, the selection criteria may include the requirement by a supplier not to display available products. For example, in some circumstances a scheme promoter or client may not wish products to be displayed or included in the catalog which are from a competing brand or competing programme.

In an embodiment, the invention has the advantage that catalogs may be built of desired appropriate best price items according to requirements specified by scheme promoters.

In an embodiment, the selection criteria may be based upon any data which may be available in the product data.

In an embodiment, where selection of product data is based on selection criteria, selector comprises a controller arranged to implement the selection criteria. In an embodiment, the controller may comprise a search query generator enabling search queries for searching the product provider data for the product data conforming with the selection criteria.

In an embodiment, the controller comprises a robot manager which is arranged to initiate and manage "search robots" which implement the selection criteria, by way of implementing search queries. In an embodiment, the receiver is implemented by the controller further comprising a receiver interface for managing receiving of the product provider data. In an embodiment, the controller also comprises a virtual currency converter which is arranged to convert data values of products to virtual currency. In an embodiment, the virtual currency converter is arranged to arrange items to be placed in award levels within a catalog.

In an embodiment, the search query generator comprises a "wizard" enabling search queries to be built (search queries subsequently being initiated and maintained by the controller and implemented in the form of search robots).

In an embodiment, the selector is arranged to regularly update product data in the catalog with any changes to the data.

In an embodiment, updating takes place in real time.

In an embodiment, updating takes place on a scheduled basis as determined by the scheme promoter.

In an embodiment, updating is based on the selection criteria.

An advantage of this embodiment is that the catalog is "dynamic", in the sense that it may be continually updated without the need for manual intervention. If product provider data changes result in product data falling within or outside the selection criteria, the catalog is updated. If the popularity or sales frequency of an item changes, for example, this may cause specific products to fall within or outside the selection criteria impacting the product selection for a given catalog. Further, changes in the product mix and price of the products by the product provider may also result in updating of the catalog. Selection criteria may also be changed as required, leading to changes in product data. Where the catalog is associated with a loyalty or incentive scheme, the selection criteria may be changed as required by a scheme promoter.

In an embodiment, where the selector is arranged to update the product data with changes and where the system includes a controller and a search query generator, the controller is arranged to automatically run search queries to search the product provider data for obtaining the updates. These automatic search queries carrying with them a selection criteria are referred to as "search robots".

In an embodiment, the selector is arranged to provide product data to a plurality of on-line product catalogs. Different product data may be provided to each of the plurality of product catalogs. This embodiment of the present invention has the advantage that the system may support a number of product catalogs from the same product provider data, utilising the selector to populate each product catalog as, for example, desired by the scheme promoter.

In the embodiment employing search robots, each catalog may be provided with their own search robots enabling automatic updates to the product mix and/or price of products or services within the catalog. Search robots may serve more than one catalog.

In an embodiment, the catalog may be associated with a loyalty or incentive scheme.

In an embodiment, the products in each catalog may each have a purchase value which may be represented by points (virtual currency) in a loyalty or incentive scheme. Where there are a number of catalogs across a number of loyalty or incentive schemes, the same product in those catalogs may have different point values. In an embodiment, the system includes a virtual currency converter which is arranged to convert values of products to point values in accordance with a virtual currency conversion rate. The points value conversion rate may be set in response to requirements of an incentive/loyalty scheme promoter of the points conversion rate may be variable in accordance with requirements of the promoter of the loyalty/incentive scheme. In an embodiment, the virtual currency converter is also arranged to update point values of products according to price changes (as ascertained from product provider data). In an embodiment, each catalog is associated with its own virtual currency converter according to the requirements of each scheme promoter. In an embodiment, as discussed above, where the system includes a controller, the controller may comprise price/points Filters implementing the virtual currency converter.

In an embodiment, the virtual currency converter has the option to include a default percentage mark up on the products in each catalog, this percentage mark up producing a return to the scheme promoter (or other entity involved in the business).

In an embodiment, the virtual currency converter can be set to include an estimate for relevant sales tax to be added to the price of the item in calculating the point value of a product to be displayed. In an embodiment, the points value converter can be set to include an estimate, or actual, shipping costs for the item in calculating the point value of a product to be displayed.

In an embodiment, the virtual currency converter may also comprise price range limiters that are arranged to limit the product data provided to the catalog based on price. For example, price limitations may include that any item above or below a certain price quantum not be included in the catalog (i.e. it is filtered out).

In an embodiment, the system is arranged to implement levels of reward redemption options within a catalog. These levels may be defined by price ranges (e.g. "gold", "silver" and "bronze" ranges) and sub-sets of products within a catalog are deposited to each level by the virtual currency converter based on the price of the product at that time. The virtual currency converter in this embodiment is arranged to automatically organise product data from suppliers into each of these levels according to the price of the product or other criteria as determined by the selector. A participant being granted a "gold" award would have access to those items displayed within the "gold" level of the catalog. Levels will generally be defined by price ranges, but are not limited to this and may include a particular range of products, regardless of price.

In an embodiment, the system also includes an order and reconciliation means, which is arranged to receive orders from subscribing users accessing the catalog and selecting products, and process the orders and reconcile payment (e.g. with virtual currency and/or actual currency) with suppliers. In an embodiment, the reconciliation means is arranged to receive shipping and tracking confirmation from product suppliers which can then be communicated through the user's account in the incentive/loyalty scheme to the recipient of the product.

In an embodiment, the system also includes a facility for account holders in an incentive/loyalty marketing scheme to use an alternative payment mechanism such as a bank credit or debit card, to use a combination of virtual and actual currency to place an order in a program.

In accordance with a second aspect, the present invention provides a method of providing product data for use in an on-line product catalog, the method including the steps of receiving product provider data from a product provider system, and selecting product data from the product provider system for supply to the on-line product catalog.

In an embodiment, the selection of product data is carried out in accordance with selection criteria. The selection criteria may include one or more of the following: product category; location of manufacture; geographic availability; date of availability; currency; product popularity; product availability; seasons; product types; product brands; destination; travel date range; value (based on difference between suggested retail price and sale price).

In an embodiment, the method comprises the further step of providing updates top product data in the catalog. In an embodiment, the step of providing updates is carried out in response to changes in product provider data. In an embodiment, the updates are provided in response to changes in selection criteria. In an embodiment, the step of providing the updates is carried out in real time.

In an embodiment, the method comprises the further step of providing product data to a plurality of on-line catalogs. In an embodiment, the step of selecting product data for each catalog includes the step of selecting product data for each catalog in accordance with selection criteria, wherein each catalog may include different product data.

In an embodiment, each product associated with product data is allocated a virtual currency value, and the virtual currency value may be different for the same product in different catalogs. In an embodiment, the method includes the further step of converting currency values of products to virtual currency points in accordance with a points conversion rate.

In an embodiment, the method comprises the further step of enabling processing and reconciliation of orders for products from the catalog.

In an embodiment, the step of receiving product provider data includes the steps of receiving the product provider data from a plurality of product provider systems.

In an embodiment, the selection of product data is carried out automatically by the system by implementing search criteria applied in software and/or hardware. Search criteria may be implemented by way of search queries querying the product provider data. In an embodiment, search queries are implemented by search robots which are arranged to continuously or periodically access the product provider data and implement the search queries. In an embodiment, this has the advantage that the catalogs are updated as dictated by operation of the search robots, and this may be in accordance with requirements for the catalog.

In one embodiment, the product provider data is "pushed" and the robots operate on the push data to apply the search queries and populate/make changes to the catalog. "Pushing" data generally includes transmission of data from a third party supplier to the system of this embodiment of the invention.

In another embodiment, the product provider data is "pulled". A search robot is arranged to obtain the product provider data periodically, continuously or as the data is required in the catalog, apply the search criteria and provide the filtered data to the catalog. In an embodiment, a search robot which is arranged to pull data is triggered in response to a participant querying a catalog as to the particular product data. In an embodiment, pulling of data means obtaining data in response to a data request initiative by the system of this embodiment to a supplier system.

In an embodiment, the product provider data may be obtained by a combination of push and pull.

In accordance with a third aspect, the present invention provides an on-line catalog, which is populated with product data received from a system in accordance with the first aspect of the present invention.

In accordance with a fourth aspect, the present invention provides a catalog redemption system which includes one or more catalogs in accordance with the third aspect of the invention and a system for supplying product data to the one or more catalogs, in accordance with a first aspect of the present invention.

In accordance with a fifth aspect, the present invention provides a method of implementing a promotion scheme, comprising the steps of making available an on-line catalog in accordance with the third aspect of the invention, via which end-users may redeem virtual currency in accordance with the scheme.

In an embodiment, the method comprises the further step of providing rules governing the earning of currency. Such rules may govern, for example, what actions need to be taken by users to earn currency e.g., flying on particular airlines, achieving performance outcomes at the workplace.

In accordance with a sixth aspect, the present invention provides a method of facilitating a promotion scheme, comprising the step of providing product provider data to a system in accordance with the first aspect of the invention.

In accordance with a seventh-aspect, the present invention provides a computer program including instructions for controlling a computer to implement a system in accordance with the first aspect of the invention.

In accordance with an eighth aspect, the present invention provides a computer readable medium providing a computer program in accordance with the seventh aspect of the invention.

In accordance with a ninth aspect the present invention provides a computer program including instructions for controlling a computer to implement a on-line catalog in accordance with the third aspect of the invention.

In accordance with a tenth aspect, the present invention provides a computer readable medium providing a computer program in accordance with the ninth aspect of the invention.

In accordance with an eleventh aspect, the present invention provides a computer program including instructions for controlling a computer to implement a catalog redemption system in accordance with the fourth aspect of the invention.

In accordance with a twelfth aspect, the present invention provides a computer readable medium providing a computer program in accordance with the eleventh aspect of the invention.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
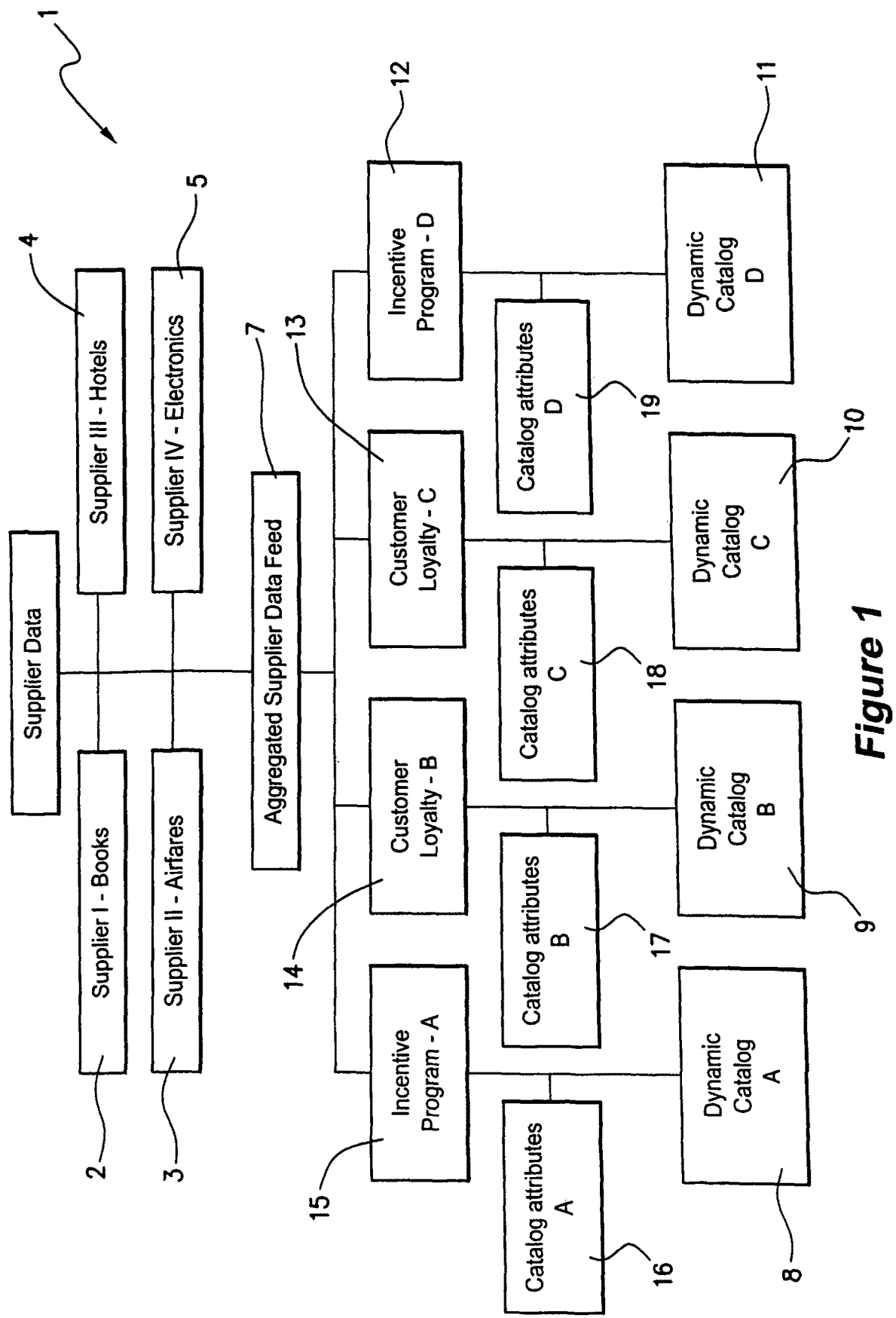
FIG. 1 is a schematic diagram of a system in accordance with an embodiment of the present invention.

FIG. 1 is a schematic diagram of a catalog redemption system consisting of several independent elements and including a system for providing product data in accordance with an embodiment of the present invention. The catalog redemption system of FIG. 1 includes product provider data, in this example being in the form of supplier data 1 from a number of on-line provider systems. In this example, a supplier may supply product data in relation to books (reference numeral 2), a second supplier may supply product data on airfares (reference numeral 3), a third supplier product data on hotels (reference numeral 4), and a fourth supplier product data on electronics (reference numeral 5). Note that the present invention is not limited to books, air fares, hotels and electronics. Any other product may be provided from any suppliers that provide a data feed to this system. A supplier may be a on-line aggregator, for example, a travel aggregator that provides a multitude of products from individual suppliers. Such an aggregator may be one of the suppliers of product data in this system, together with other individual suppliers who do not aggregate data but only supply data on their own products. A supplier may be a provider of retail stored value gift cards. A supplier may be a provider or electronic formatted music, video, software, games or other digitally downloadable product. A supplier may be a provider of coupons or discount offers. With the rapid emergence of the internet as a medium of trade the number of suppliers of products and services transacting over the internet increases each year.

A receiver (not shown in FIG. 1) receives all the product provider data as an aggregated supplier data feed 7 from which product data is selected by a selector (not shown in FIG. 1) to be provided to a plurality of on-line catalogs 8, 9, 10, 11. In this embodiment, each of the catalogs 8, 9, 10, 11 are associated with incentive programs and customer loyalty programs 12, 13, 14, 15. Each of the catalogs 8, 9, 10, 11 is provided in accordance with this embodiment with associated catalog attributes 16, 17, 18, 19. These catalog attributes are set by the system and include selection criteria to select what product data from the aggregated supplier data feed 7 appears in each of the catalogs 8, 9, 10, 11.

In More Detail:

Aggregated supplier data feed 7: This relates to the combined data supplied by numbers of independent product or service suppliers. The data provided by each supplier may include but is not limited to: pricing, product, name, description, popularity, category, warranty, ratings, geography, currency, shipping costs, sales tax or other relevant attributes to the product or service being provided. The data from these providers is combined to form an aggregated supplier data feed into the system. Incentive Programs 12, 13, 14, 15: These relate to web-based incentive or loyalty marketing points programs. These programs may be setup by a single company or multiple independent companies who are accessing the aggregated supplier data feed to offer products in their respective reward catalogs. Companies setting Lip incentive programs may be a scheme promoter such as an end user client e.g. a retailer, airline, bank and employer. The scheme promoter may also be a incentive/loyalty marketing company, a human resources consultancy, a training company, a market research company, educational institution or other business or government body seeking to implement an incentive/loyalty marketing scheme.

Catalog attributes: Each catalog has a number of attributes that determine what data from the aggregated supplier data feed should be included in the catalog. The catalog attributes may govern the rules associated with which subset of products from the supplier data should be displayed considering price, category, popularity, warranty, ratings or other product or service attributes available in the supplier data and specified in the selection criteria. For example, if other criteria are available in the supplier data, then the criteria may be utilized. For example, supplier data may include "child safety ratings" and this could be utilized as a selection criteria, for a selector (in this embodiment implementation comprising search robots) working on providing childrens' products to a catalog.

The catalog attributes also determine what value in virtual currency a product should be displayed at. In this embodiment the virtual currency conversion is implemented by a virtual currency converter. The virtual currency converter in an embodiment may manage assignment of products into award level categories within a catalog (e.g. "gold", "silver", "bronze"). Catalog attributes also govern what the sale price for products in the catalog will be presented as, virtual currency or award tokens, considering the percentage mark LIP that scheme promoters may seek to make as a return from the resale of products from the aggregated supplier data feed. Catalog attributes also govern whether shipping and sales tax should be included in determining the point value of an item. Catalog attributes also govern what set of products can be displayed based on the geographic location of the participants in the incentive/loyalty marketing scheme accessing the catalog.

The catalog attributes are implemented by the selector in accordance with the selection criteria. In accordance with this embodiment, the selector comprises set by a controller which in this embodiment includes a search query generator for generating search queries for searching the aggregated data. The search queries implement catalog attributes by selecting data in accordance with those catalog attributes. Each catalog 8, 9, 10, 11 may contain different product data, coming from the plurality of suppliers. In this embodiment, the controller comprises search robots, which may be implemented by software and/or hardware, that operate to implement the selection criteria (and therefore the catalog attributes). In this example, the controller also comprises price/points filters to implement the virtual currency converter, and also a receiver interface implementing the receiver.

In this embodiment, catalogs 8, 9, 10, 11 are continuously updated with product data and in this sense are "dynamic". The updating is implemented by automatic implementation of the search queries by the controller (implementation of "search robots"), in order to implement the selection criteria in accordance with the catalog attributes. As attributes of the product provider data change, e.g. price, warranty, consumer ratings, frequency of sale (top sellers), geography, or other attributes, then they may fall within or outside of catalog attributes for the catalogs and the catalogs will be updated accordingly by the search robots. Product data may be obtained and updated by either receiving a "push" of product data from a supplier or "pulling" the data utilizing the search robots to initiate a request for updated product data from a supplier. This will be described in more detail later.

The system also includes an order and reconciliation facility by which participants in the program may order products from the catalogs. The products are then ordered by the system and reconciliation takes place including deducting an appropriate amount of points from the participant's account and payment to the product supplier. The system also includes an order status and shipment notification facility to update participants in an incentive/loyalty marketing scheme on the status of their order.

The system of this embodiment enables participants in incentive or loyalty marketing programs to redeem their points or other virtual currency for products that are offered in "dynamic catalogs". The catalogs are updated in real-time based on changes in products in relation to predetermined criteria, such as product availability, price, point currency value exchange rate, popularity, etc. Each of the dynamic catalogs 8, 9, 10, 11 contains a unique sub set of products provided by third party suppliers of products. Four dynamic catalogs are shown in FIG. 1, it will be appreciated that there may be less or more than this number of catalogs supported by the system.

The following examples illustrate some types of catalog that may be implemented in accordance with this embodiment and demonstrate some advantages of the system. The following are examples only. In operation, catalogs will be built based on attributes specified by the programme sponsor (who may be a client or a scheme promoter, for example). The following examples help to illustrate catalogs may be different from each other, for purposes of illustration. There may be many variations on the following catalogs.

Travel redemption catalog: The catalog only includes travel products from a select number of airfare or hotel product suppliers, for example brands of hotels and/or four star hotels and above and/or hotels in a particular, geography who are approved by the scheme promoter. A participant in the program would select a city and travel date from those cities available in the catalog according to the catalog rules. The system would then request product availability data from participating hotel and/or airfare suppliers and display the travel options that pass through the search query in points as per the exchange rate for that specific catalog. The catalog would display those room nights or airfares where inventory is available.

If a participant in a program views the catalog over several times during a single day, the number of points required to redeem a specific item may change according to changes in pricing by the supplier. Alternatively a hotel or airfare that was available in the morning may no longer be available in the afternoon due to changes in product inventory.

The same travel redemption products may also be available in multiple programs but due to changes in the point do dollar ratio or other relevant rules (for percentage markup for scheme promoter) for each catalog, the same item may require a different number of points to be redeemed.

Hotels and airfares are examples of types of products where it is more convenient for the system to "pull" the product data from the supplier, at the time the participant in a program makes the request, to ensure that the data is current. This is because the hotel and airfare data changes frequently. Pulling the data ensures the currency of the catalog (maintains the data as up-to-date as possible). It is the nature of the data that determines whether it is pull-type data. The more volatile the data (the more rapidly it changes) the more likely it is to be suited to a pull operation. As will be discussed in more detail later, a pull operation may be responsive to a user query for this type of product data.

Merchandise redemption catalog: A participant in a program could select a category of reward products such as electronics. The catalog would display all currently available electronic products at the point values for those products at that time the redemption request was made. If the participant selects the same category at some time later (e.g. hours, day, week), the products displayed in the catalog may be different due to changes in the price of the item, its availability or popularity.

Electronics and other similar-type goods are examples of categories where a push of product data may be the most convenient way to obtain updates of the product data. This type of product data doesn't change as rapidly as data such as airfares and hotels. A push of data at regular intervals may therefore be sufficient to maintain the accuracy of the product data in the catalog. The nature of this data is that it is relatively non-volatile. It is therefore more suited to a push operation occurring at intervals.

Books/Movies/Music redemption catalog: A participant in a program could select movies. The search query within the catalog would display the top 200 selling movies, books or music products from a given movie supplier in point values at that time. If the participant selects the same category at a later date, e.g. a week later, the product displayed in the catalog may change reflecting changes in consumer buying preferences with a different set of movies/books/music products reflecting the top 200 sellers at that time.

Price range catalogs: A participant in a program may only be able to redeem products within a given point range as specified by the incentive or loyalty marketing program provider. For example products displayed in the catalog would only be between $50.00 and $500.00. In this embodiment of the system, the virtual currency converter may be implemented by a price/points filter which restricts items greater than $500 or less than $50 from being entered into the catalog.

Category based catalogs: A participant in a program may only be able to redeem products within a given category. For example participants can only redeem their points for health orientated products.

Point of manufacture catalogs: A participant in a program may only be able to redeem products that are made within a specific country. For examples participants can only redeem their points for products that are labeled as made in America.

Geographic catalogs: A participant in a program may only be able to redeem products or services that are available for shipping within a given country. For example participants can only redeem their points for products that can be shipped within the US.

Digital distributed products: A participant in a program may only be able to redeem products or services that are in the form of digital content. For example participants can only redeem their points for downloadable music, video games, movies, software or digital gift certificates.

Time sensitive catalogs: A participant in a program may only be able to redeem products or services that are available within a given time frame. For example concert or sporting ticket events whereby an item will only be available to be redeemed within a given date range, based on availability.

Educational catalogs: A participant in a program may only be able to redeem products or services that are within educational or learning categories and are on the curriculum for school or college. For example participants can only redeem their points for text books.

Level Catalogs: A catalog may be divided into a number of levels. If a participant reaches a particular award level, then they may obtain products which are included in the catalog at that level. For example, a catalog may be divided into "gold", "silver" and "bronze" award levels. The programme participant may be awarded a particular level or may achieve a level depending upon achieving particular programme requirements. Once the level is achieved, the participant may be able to select products from that particular level. As discussed above and in more detail later, the system of this embodiment is arranged to automatically categorise products into designated levels. The level of a product is categorised in may depend on price of the product or other criteria. In a level catalog, no virtual currency (i.e. "points") is involved in the redemption process. The recipient of an award within a level catalog simply selects one item from the corresponding level of their award. For example, an award for years of service may enable a recipient to select from any items in the gold level which corresponds to an award for 10 years for service for a specific employer.

Concert Ticket/Sporting Goods Catalog: This catalog includes concert or sporting tickets. Participants are able to select from a specific sport, or artist or genre of music or even team.

The above examples present illustrations of how dynamic catalogs are constructed and updated on an going basis, consisting of a combination of products or services offered by third party suppliers, limited or governed by rules (as implemented by the selection criteria and points conversion means) that governs the display of products or services for a specific client catalog.

Advantageous features of this embodiment include:
- Aggregation of multiple, real-time data sources from suppliers of products to increase the selection choice of redemption options in catalogs.
- Ability to update and maintain subsets of products from suppliers to produce catalogs without the need for manual intervention
- Ability for each catalog to maintain a unique set of selection means which governs the mix of products in each catalog
- Automated updating of point values of products according to price changes.
- Ability for each dynamic catalog to have a unique dollar to point conversion rate.
- Ability for each dynamic catalog to have a default mark up percentage/profit margin
- Ability for each catalog to be unique to a geography
- Ability for catalogs to be kept up to date, fresh, exciting for participants without the need for manual intervention
- Ability for catalogs to include the top selling/most popular products
- Ability for catalogs to only display those products or services that are currently available and not display products that are not in inventory or available from a given supplier
- Ability for scheme promoters to have control over the quality, nature, brand or other attributes in catalogs. In an embodiment, the scheme promoter may control the system or may have an interface to the system, whereby they can have input to the selection criteria.
- Ability to automatically add or remove products in numbers of catalogs according to criteria such as: popularity, product category, price range, brand of product or service, type of product or service, destination location, travel date range, season, consumer rating, geography or other variable data attached to products.
- Ability to deliver better value to participants inside programmes, because of the ability to modify price (and other categories) according to changes in the market place rather than having to be limited to a static price or other category for a particular time period. This is because the data is substantially current and is kept so by the controller. In the prior art, relatively static, catalogs, price is set for a time period and is not changed according to market value. An example is electronics products which tend to decrease in value over a period of time following their release. Catalogs implemented by the system of the present invention may follow the price changes closely, wherein the prior art static catalogs will not.

An example architecture for implementing a system in accordance with this embodiment of the invention will now be described with reference to FIG. 2. It will be appreciated, however, that the system in accordance with the present invention may be implemented by any appropriate hardware and software architecture, in accordance with the functionality described above. The invention is not limited to the architecture of FIG. 2 which is merely one implementation.

Figure 2:
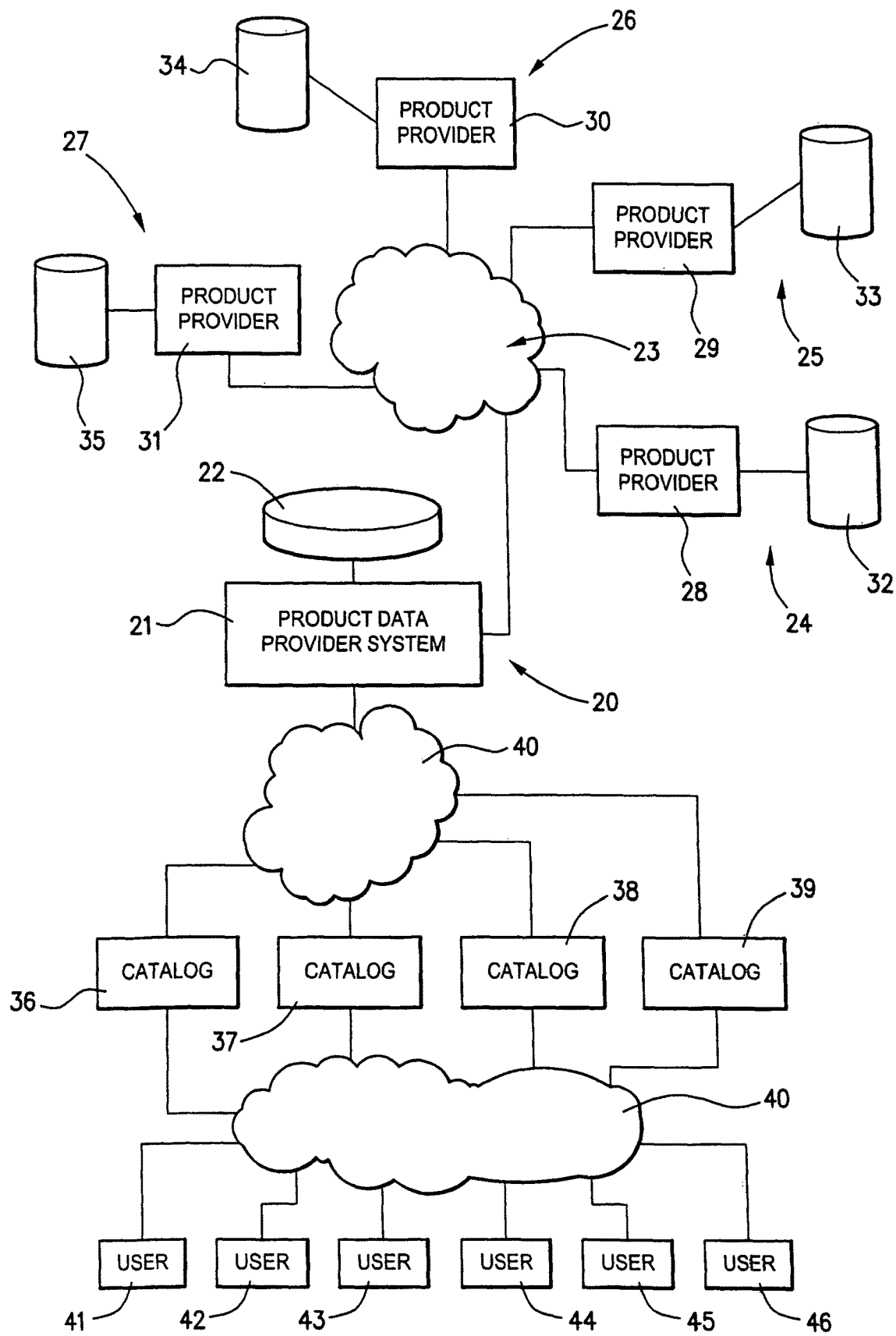
FIG. 2 is a block diagram of a computing system for implementing an embodiment of the present invention.

Referring to FIG. 2, a system for providing product data for use in an on-line product catalog in this embodiment is implemented by a computing system 20, which, in this embodiment, may be any appropriate server computer 21 and associated storage means 22 for providing a database facility.

In this embodiment, the product data provider a system 20 is arranged to receive product provider data from a network 23 link to product provider systems 24, 25, 26, 27. The product provider systems 24, 25, 26, 27 may be associated with retailers, merchants, aggregators or any provider of products such as hotels, airlines, on-line book stores, electronic product providers, film providers, on-line music providers and any other product supplier able to provide a data feed on products and services.

In this embodiment, each product providers system 24, 25, 26, 27 includes a sever computer 28, 29, 30, 31 and associated database 32, 33, 34, 35 for storing product provider data.

Note that although four product provider systems are shown in FIG. 2, it will be appreciated that there may be less than this or more than this.

The product data provider system 20 comprises a receiver which is arranged to receive product provider data. The receiver is, in this embodiment (as will be described in more detail later) implemented by a controller. The receiver is arranged to store product provider data in a database 22 or grant access to the data and manage communications with the supplier systems 24, 25, 26, 27, so that the data can be processed to populate catalogs. The product provider data may be provided to the product data provider system 20 in convenient fashion. It may be "pushed" or "pulled", depending on what is most appropriate. The network 23 utilised for transport of the product provider data may be any network. In this embodiment it is the Internet.

Where the product provider data is stored in the database 22 (for subsequent processing for the catalogs) it will be stored depending upon the attributes of the particular data. For example, data such as music may include different attributes to data such as televisions. Different fields may be provided for different data and the database will be partitioned accordingly. The data will essentially be grouped or organised by category or field attributes.

Whether the data is stored in the database or is accessed to be provided directly to the catalog (without storage in the database) will depend upon the nature of the data. The more volatile the data, the more likely it is to be pulled and accessed at the time that it is required, and not stored in the database.

The product data provider system 20 includes a selector (implemented by appropriate software) for selecting product data to be provided to dynamic catalog computer systems 36, 37, 38, 39. The product data is provided over a communications network 40 which in this embodiment may also be the Internet. As described in more detail later, the selector may be implemented as one or more search robots which are arranged to receive and aggregate the supply of data (and subsequently apply search queries in accordance with catalog attributes to populate the catalogs). The search robots may determine whether the supplier product provider data is to be "pushed" or "pulled". If pulled, the robot(s) may be active in implementing the pull.

Each catalog system 36, 37, 38, 39 includes a server computer, which is arranged to serve web pages to participant users computers 41, 42, 43, 44, 45, 46 over a communications network 40. The user computers may be any available device which provide a means to connect to a communications network, such as a PC, laptop, mobile device, etc. Users may therefore access the catalogs 36, 37, 38, 38 by way of their computers 41, 42, 43, 44, 45, 46 in order to browse the catalogs of the programs that they are participants in and select products for purchase.

In an alternative architecture, the catalogs are not implemented by separate hardware but are supported by the product data provider system 21, which may communicate catalog information directly to the users.

As discussed above, the selector provided by the product data provider system is arranged to select product data for each of the catalogs 36, 37, 38, 39 in accordance with selection criteria such as price, availability, type of product, consumer rating, and any other selecting criteria. The selector is implemented by a controller which includes a search query generator in the product data provider system 20, for generating search queries in accordance with catalog attributes for each of the catalogs 36, 37, 38, 39. These catalog attributes are determined by the loyalty/incentive scheme promoters. As discussed later, the controller and search query generator implement search robots. Separate search robots may be responsible for different catalogs/different categories of products.

In accordance with the selection criteria, the product data provider system 20 provides the appropriate product data to the catalogs 36, 37, 38, 39 from database 22.

The product data is constantly updated by automated regeneration of the search queries (e.g. search "robots") updating the product data at frequent-intervals.

The product data provider system 20 also includes a virtual currency converter responsive to the catalog attributes to generate a points value conversion for each product for each catalog. As discussed above, different incentive/loyalty programs in different catalogs may have different points conversion rates. These may be updated automatically in accordance with changes in catalogue criteria and changes in supplier prices. Where a level catalog is implemented, the virtual currency converter is responsive to the catalog attributes to place products in the appropriate level, and a points value may not be generated.

The product data provider system 20 is also arranged to deal with ordering of product by the participants, payment to the suppliers for purchased product and account reconciliation (i.e. notification of the appropriate amount of points to be deducted from a participants account).

In the above embodiment, four catalogs and six users are shown. It will be appreciated that there may be many more or less than those catalogs and many more users or less than those number of users.

Example implementations of catalogs by systems in accordance with embodiments of the present invention will now be described with reference to FIGS. 3 through 6.

Figure 3:
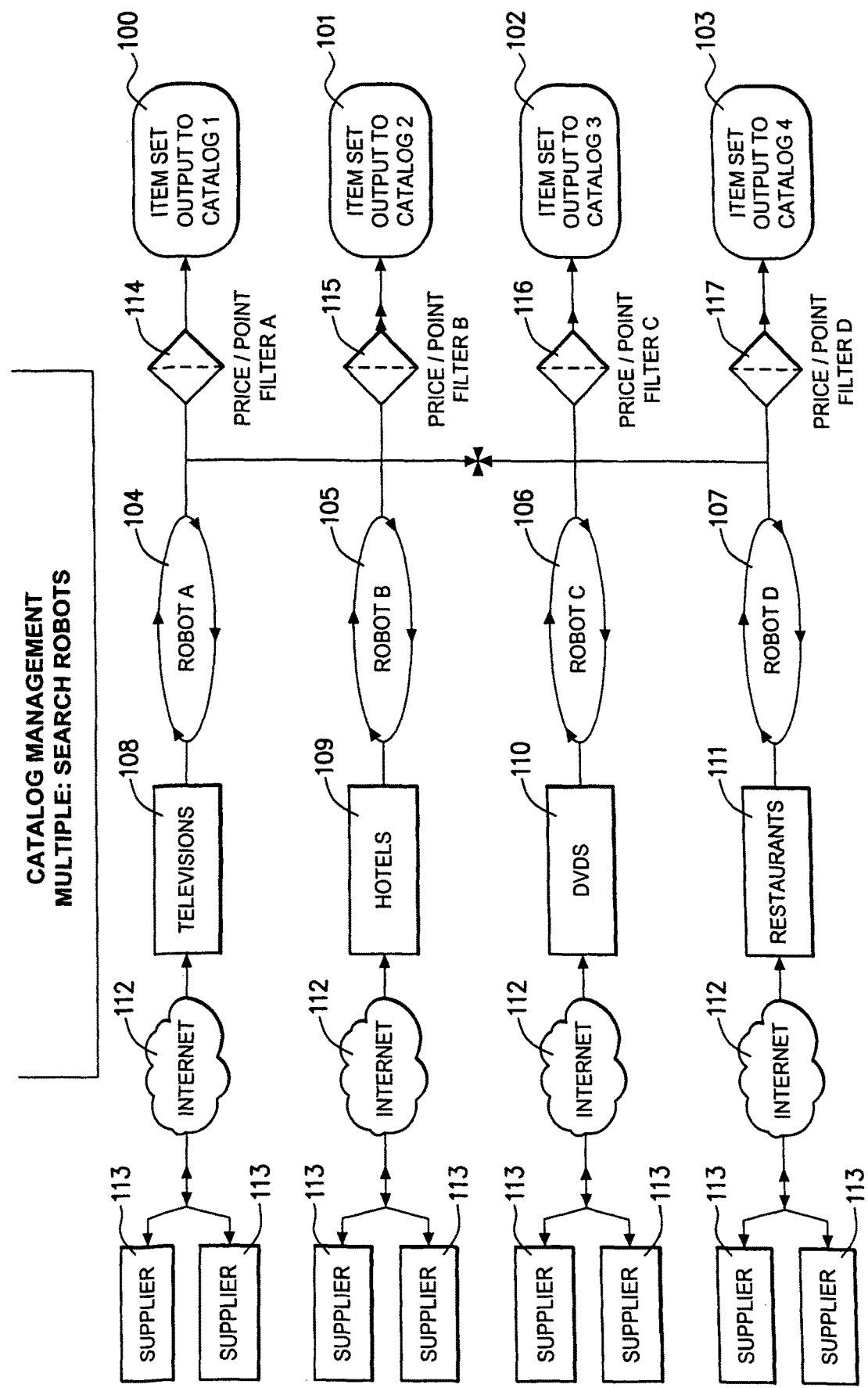
FIG. 3 is a functional schematic diagram illustrating operation of an embodiment of the present invention.

Referring to FIG. 3, this is a functional diagram showing implementation of an embodiment where multiple catalogs, 100, 101, 102, 103 are updated simultaneously by search robots 104, 105, 106, 107, applying selection criteria across a range of product categories 108 (televisions), 109 (hotels), 110 (DVDs), 111 (restaurants).

The implementation involves the following concurrent activities;

Data on the products 108, 109, 110, 111 are passed from the suppliers, via a network, such as the Internet 112. As illustrated here there are multiple suppliers 113 for each of the product types. There may be more or less suppliers than shown. As will be discussed later, product data may be pushed or pulled. The data may be aggregated into the data types 108, 109, 110, 11, by the robots 104, 105, 106, 107.

The robots, 104, 105, 106, 107 implement search queries based on selection criteria for the catalogs 100, 101, 102, 103 to filter out product data that does not meet the specified selection criteria.

The filtered product data is then passed through pricing filters 114, 115, 116, 117 which apply a points conversion and any margin that is required for each particular catalog 100, 101, 102, 103.

The product data is thus provided to the catalogs with the appropriate point conversion in place and with the appropriate product data in accordance with the selection criteria for the particular catalog.

The robots 104, 105, 106, 107 may run continuously, or may run periodically at frequent intervals, depending upon the nature of the data (which will generally govern the nature of the robot) as to whether it is volatile or non-volatile (pull or push). The automation of the robots is advantageous as no system operator input is required to maintain the catalogs.

In this embodiment, four product categories, (televisions, hotels, DVDs, restaurants) are provided to each of the four catalogs, 100, 101, 102, 103, in dependence upon selection criteria implemented by each of the robots, 104, 105, 106, 107, each robot being responsible for a particular product category.

As discussed above, the robots 104, 105, 106, 107 and price/points filters 114, 115, 116, 117 may be implemented by appropriate software/hardware provided by product data provider system 20.

It will be noted that the price/points filters 114, 115, 116, 117 are catalog specific as the points conversion rate and any margin above the supplier price will depend on arrangements with the catalog operators/clients utilising the catalogs. It is convenient that the robots 104, 105, 106, 107 are product or supplier specific, as robots may provide data for different catalogs.

Figure 4:
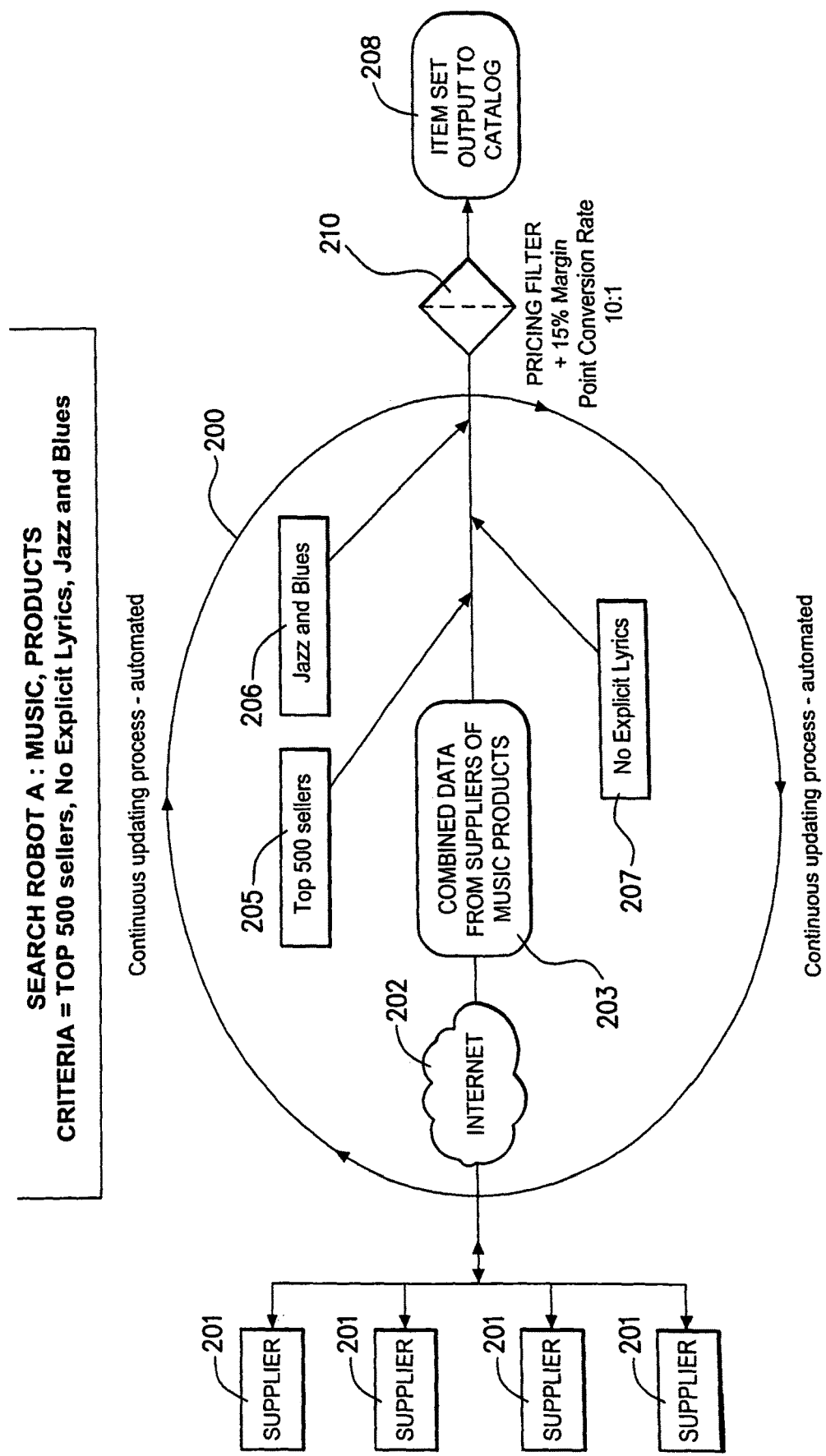
FIG. 4 is a further functional schematic diagram illustrating operation of an embodiment of the present invention.
Figure 5:
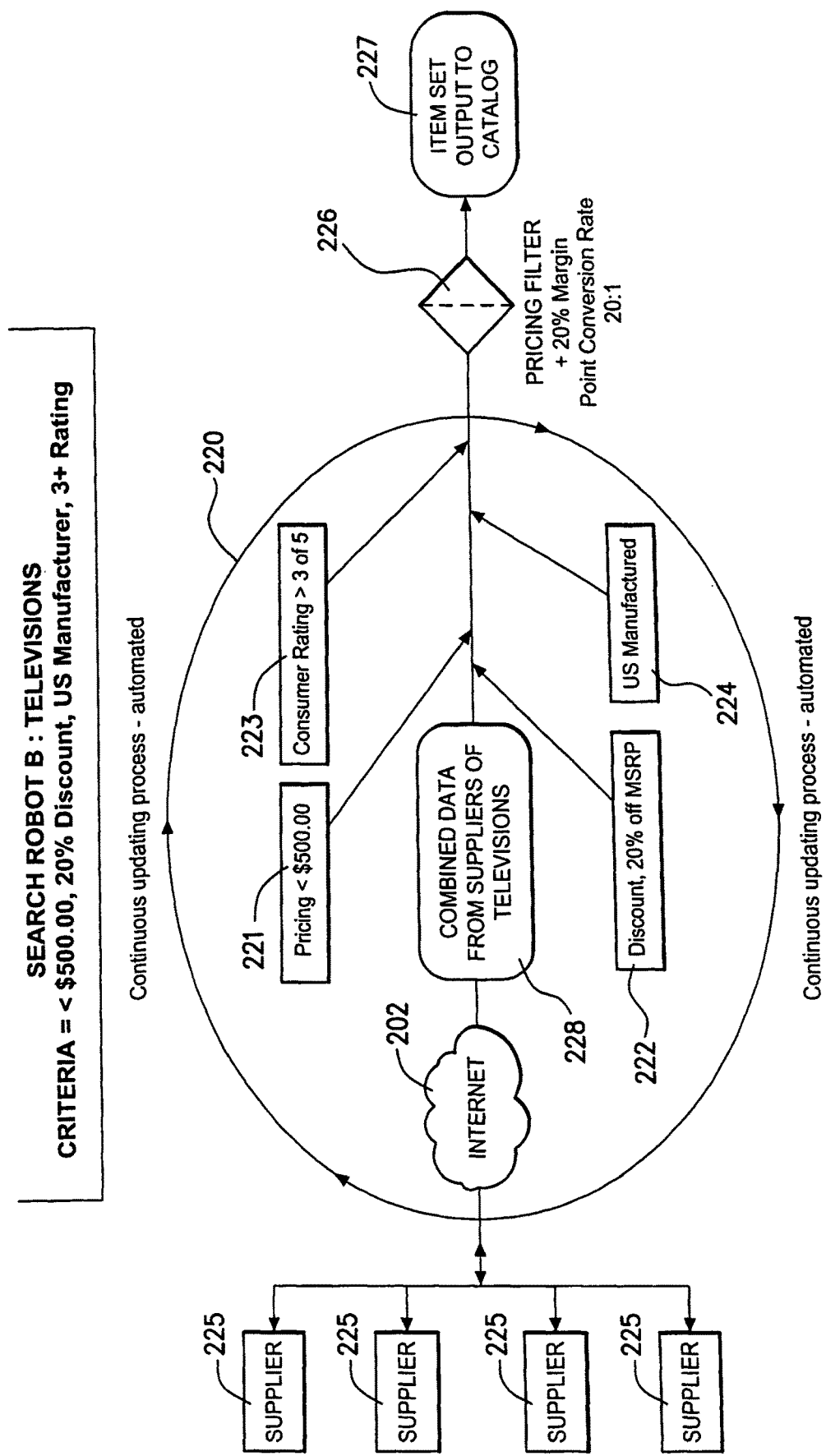
FIG. 5 is a further functional schematic diagram illustrating operation of an embodiment of the present invention.
Figure 6:
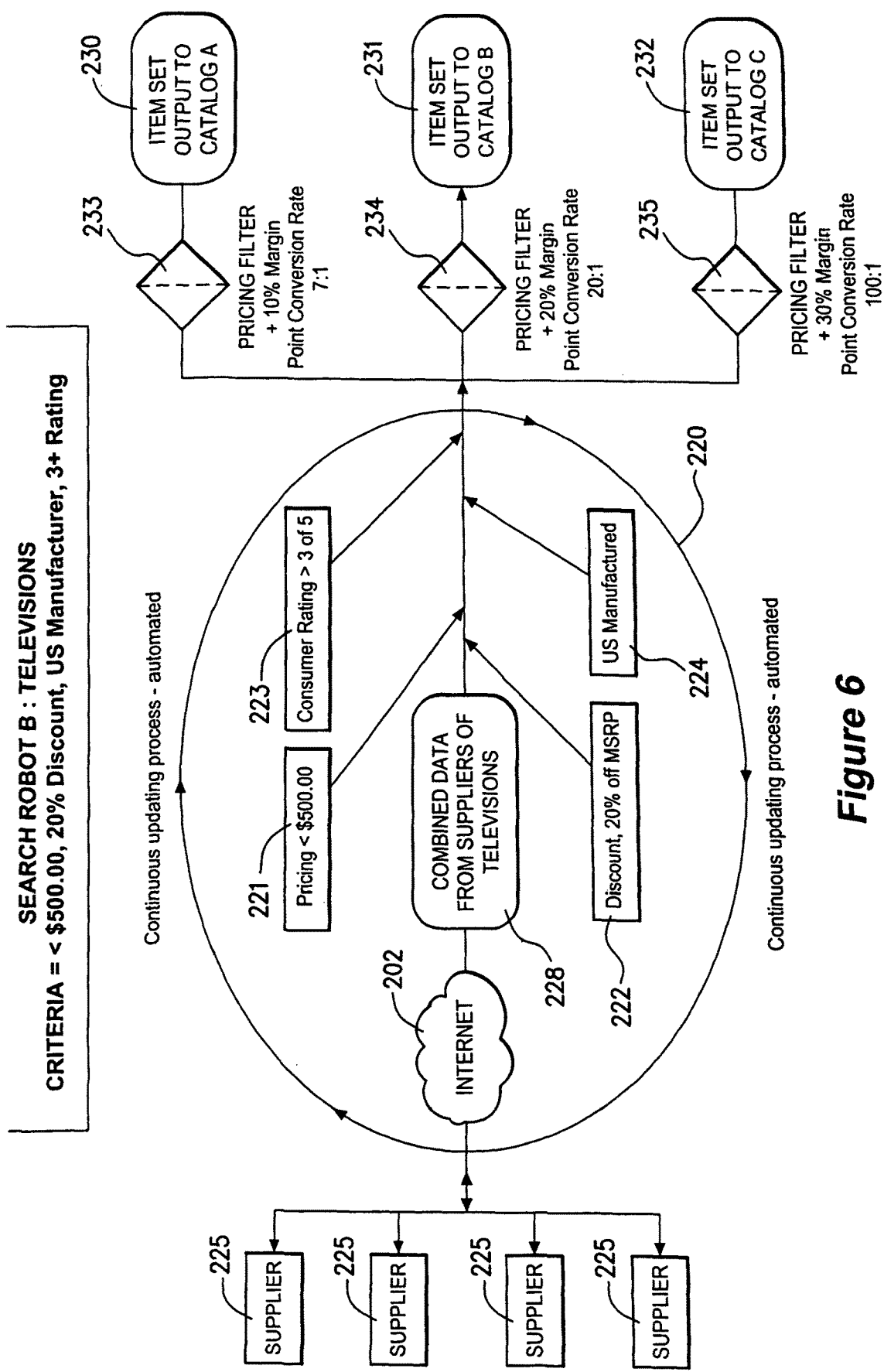
FIG. 6 is a further functional schematic diagram illustrating operation of an embodiment of the present invention.

FIGS. 4 through 6 show more detail of how search robots may be implemented and may implement selection criteria.

Referring to FIG. 4, a search robot 200 specifically arranged for music products is illustrated.

The search robot 200 is arranged to receive (either by push or by pull or a combination of both) music product data from suppliers 201. There may be more or less suppliers than shown in FIG. 4. As before, data communication is via a network such as the Internet 202. The product data is presented as a combined data feed 203. This is a representation only. In fact although here a combined data feed 203 is shown having selection criteria applied to it, in operation of this embodiment, the selection criteria are implemented as the data is obtained from the suppliers 201. As the data is being continuously obtained, it may not actually be combined with other data before the selection criteria are applied and it is passed onto the catalogs. One option, however, is that it is combined into a database and then the selection criteria are applied. Whichever option is exercised will depend upon the nature of the data (volatile or non-volatile).

In this example, search robot 200 applies three search queries 205, 206 and 207 to implement filtering of the product data in accordance with the selection criteria for the catalog 208. In this example, search query 205 filters out all music product data apart from the "top 500 sellers". Search query 207 filters out all product data which has not been categorised having "no explicit lyrics" (there is a categorisation data available for this). Search query 206 filters out all music product data which are not categorised "jazz and blues".

These search queries are examples only. Many other search queries could be applied to music products.

A price/points filter 210 is applied to add a 15% margin over the suppliers costs for the products and also to implement a points conversion rate of 10:1.

FIG. 5 shows a similar implementation of a robot but this time for different products, being in this example televisions.

In this illustration, the robot is running queries to locate and add televisions that are less than $500 in price (search query 221) being discounted by 20% off the manufacturers suggested retail price (search query 222), have been given a consumer rating of greater than three other of five (search query 223) and are manufactured in the United States (search query 224).

In the FIG. 5 example, the process involves the following concurrent activities.

Data on available televisions are provided by one or a number of product suppliers 225 through an automated data feed or data import or data entry process.

The search robot 220 filters out those televisions that do not meet the search criteria. In this illustration, the search criteria include:

Where sale price is greater than $500.00, omit from the catalog (221)

Where the current discount off the manufacturers suggested retail price is less than 20%, omit from the catalog (222)

Where the consumer rating for the television is less than 3 out of 5, omit from the catalog (223)

Where the television is not manufactured in the United States, omit from the catalog (224)

The remaining television product data that do not meet all the above criteria are then passed through a price/points 226. The price/points 226 will add a markup on the price of the item and convert the sale price of the item (i.e., in U.S. Dollars) to points according to the value of the point to dollar conversion as stipulated by the catalog attributes The item set output deposits the catalog items into the catalog (227)

This process is a continuous, ongoing process and automated once the initial catalog query for televisions has been created.

As discussed above, the supplier data 225 may be represented as a combined but the data may be in fact be processed as it is obtained from the supplier or database first and the processed.

FIG. 6 illustrates operation of the same search robot 220 as in FIG. 5, applied to television product data, but providing product data to multiple catalogs 230, 231, 232.

In FIG. 6, the same reference numerals have been used to denote the same components as in FIG. 5 and no further description will be given of these components.

In this example, the product data is provided to multiple catalogs (3 in this example) 230, 231 and 232. The data is provided via three different price/points filters 233, 234 and 235 respectively. Each price/points filter applies a different margin and conversion rate. This illustrates how different catalogs may apply different point conversion rates for real currency.

Although not shown, these catalogs may also be receiving different feed from other search robots dealing with other products.

Although the above search robots all deal with the same product type, and this may be convenient, it is not a limitation of this invention. In other embodiments, one robot may deal with multiple product data types.

As discussed above, search robots are implemented by the controller and search query generator as software/hardware (most implementation will be software) in the product data provider system 20.

A sample pseudo-code implementation of a simple robot is as follows. Please note that this is an example only. The search robots may be implemented in many ways complying with the functionality described above and are not limited to this example. They may be implemented by software, hardware, or a combination of software and hardware.

As can be seen from the following pseudo-code, the search robot is first initiated by loading its configuration data. The pricing filters associated with "search queries" are then loaded to the robot and are executed. Execution is continued to ensure the currency of the product information in the catalogs.

The following robot has been started manually. In operation the robots will continuously operate to maintain the catalog product data.

| Sample Psuedo-Code |
|---|
| Search Robot started by manual process or automated scheduler |
| Robot loads configuration data |
| Robot loads pricing filters |
| REPEAT |
|    Load search attached to Robot |
|    Load search communication object |
|    REPEAT |
|       Add search constraint to search query |
|    UNTIL All search constraints added |
| UNTIL All searches loaded into Robot |
| WHILE Searches remain to be executed |
|    Use search communication object to send search query to item data source |
|    Load local item set that the current Robot is responsible for |
|    REPEAT |
|       IF Search result matches search constraints |
|          IF Search result already exists in set |
|             IF Search result has new information |
|                Update item in local set to match new data |
|            END IF |
|         ELSE IF Search result does not exist in local set |
|            Add search result item to local set |
|         END IF |
|       ELSE |
|          Ignore search result |
|       END IF |
|    UNTIL All search results processed |
|    Load all items no longer appearing in the results from local set |
|    REPEAT |
|       IF Robot is configured to remove items which are no longer returned |
|          Flag local item for removal |
|       END IF |
|    UNTIL All local items with no search results are processed |
| END WHILE |
| Load all items that have been added, updated or flagged for removal during this process |
| REPEAT |
|    IF Item has been added to the local set |
|       Calculate item pricing based on Robot pricing filters |
|       Load all catalogs the item set is attached to |
|       REPEAT |
|          Load catalog item pricing filters from catalog |
|          Add item to catalog |
|          Calculate catalog point value based on catalog pricing filters |
|       UNTIL Item is added to all catalogs the item set is attached to |
|    ELSE IF Item has been updated during this process |
|       Calculate new item pricing based on Robot pricing filters |
|       Load all catalogs the item set is attached to |
|       REPEAT |
|          Load catalog item pricing filters from catalog |
|          Update all information on item which has been updated |
|          Calculate new catalog point value based on catalog pricing filters |
|       UNTIL Item is updated in all catalogs the item set is attached to |
|    ELSE IF Item has been flagged for removal |
|       Load all catalogs the item set is attached to |
|       REPEAT |
|          Remove the item from the catalog |
|       UNTIL Item is removed from all catalogs the item set is attached to |
|       Remove item from the local item set |
|    END IF |
| UNTIL All items added, updated to deleted during this run have been |

Sample Psuedo-Code

```
processed
    Robot stores the date this process has been run on
    Robot stores the method in which it was called (automated or
    manually)
    IF Process was started manually
        Robot stores the identification of the user who manually started the
process
    END IF
```

Robot Process Complete

As discussed above, the supplier data may be being received by the receiver in the product data provider system 20 in a number of different ways. It may be pushed by a supplier system. It may be pulled by the product data provider system 20. It may be provided (and in most cases will be provided) as a combination of push and pull. Some product data items are more appropriately suited to a push operation, while others are more appropriately suited to a pull operation.

For example, product data which is volatile i.e., changes to the data are likely to occur frequently, is more suited to pull. The data is only obtained in this instance when required by the catalog, for example. Or is pulled at frequent intervals (even when not immediately required by the catalog). Examples of volatile products are hotel rooms and airfares. They can change day by day and even hour by hour. The data may be pulled only when a user interrogates the catalog for this type of volatile product data. For example, if a user interrogates a hotel catalog for a hotel room, the user interrogation initiates a robot to pull the data and apply the search queries at the time of the query by the participant.

In one embodiment, when a system participant accesses the catalog to spend points, if the participant wishes to purchase a volatile product, they may enter data on the product they wish to purchase, and at that time (i.e., real time) the search robot may then implement a pull and carry out a search query on the pulled data to download the product data required by the participant. The search catalog in this case is fully dynamic, the product data be pulled when the participant wishes to obtain information on the product they wish to spend points on.

Alternatively, data may be pulled at frequent intervals and stored in a database for access by the participant (i.e., the participant accesses already obtained filtered data and the participants query does not initiate a pull event).

Less volatile data may be suited to data feed by push. Such data may include products whose categories e.g. price doesn't change too often. These may be hardware goods such as electronics, books and similar goods. Supplier data feed may push this product data out to the system 20 at periodic intervals, the system 20 then filtering the data to populate the catalog.

In many instances, a catalog may be made up of a mixture of pull and push data.

How the data is obtained will depend generally on the nature of the data.

A search robot may be applied to the data concurrently or sequentially. For example, the search queries may be applied to the data as it is received at the same time. Alternatively search queries may be applied sequentially.

The search robots may include a plurality of search queries, as shown in the examples above, or a single search robot may include a single query and multiple search robots may therefore be applied to apply multiple search queries.

A scheme promoter may be provided with access to the system via an interface which enables them to set the search queries for the search robots. Alternatively, the scheme promoter may own and run the system 20.

The system may obtain product data from any number of suppliers. As discussed above, the type of data feed from the supplier may vary and may be transmitted unevenly and pushed or pulled. The system and search robots will be arranged to cope with the "unevenness" of the supplier data.

Some examples of selection criteria that may be applied to the product data have been given above. Selection criteria may be a function of the type and nature of the product. Not that different options to use different selection criteria are dependent upon the availability of various selection criteria options, primarily determined by the category or service to be included in the catalog. Further examples of selection criteria are given below, broken down by category.

Travel Products: Hotel, Airfare, Cruise, Car Rental, Vacation Property
 Star rating (1-5 star)
 Class of booking (business, economy)
 Destination (country, city, state)
 Brand (British Airways, QANTAS, Hilton, Marriott)
 Amenities (pool, gym, free internet)
Merchandise: Electronics, Home wares, Appliances, Computers, Sporting Goods
 Price
 Availability
 Consumer rating
 Sales rank
 Discount off MSRP
 Country of Manufacture
 Safety rating (children's toys)
 Power Options (110 versus 240, both)
 Environmental: recyclable, no CFCs, no oils
 Consumable: (food)
 Fat levels
 Health rating
 Country of origin
Entertainment Products Books, Movies, CDs, Video Games
 Rating (G, M, R)
 Language (explicit language ret)
 Category (Science Fiction, Educational, Business)
 Format (downloadable versus physically sent, DVD, CD, Mac, PC)
 Top sellers by supplier
 External ranging (i.e. Billboard 100)
 Release date
Services and Experiences: Spa treatment, Massage, lawn Service, Maid Service
 Price
 Availability
 Geography
 Safety
 Consumer Rating/Feedback
Concert Tickets/Sporting Events:
 City
 Team
 Sport
 Artist
 Class of ticket As discussed above, the price/point filters may also implement level catalogs. Only items which fall between various price ranges will be eligible to be placed within a particular level of a level catalog. The price/points filters may implement the level catalogs by setting the specified price ranges.

As will be appreciated, there may be many more selection criteria, based on the nature of products and categories available.

In one embodiment "trust" may be a selection criteria. If a supplier is a "trusted supplier" (i.e., from product quality, price or any perspective) then this may be one of the categories exercised for population of a catalog. Trust may be measured by assessing how many people have bought from a supplier, for example. This could be assessed by the system.

Figure 7:
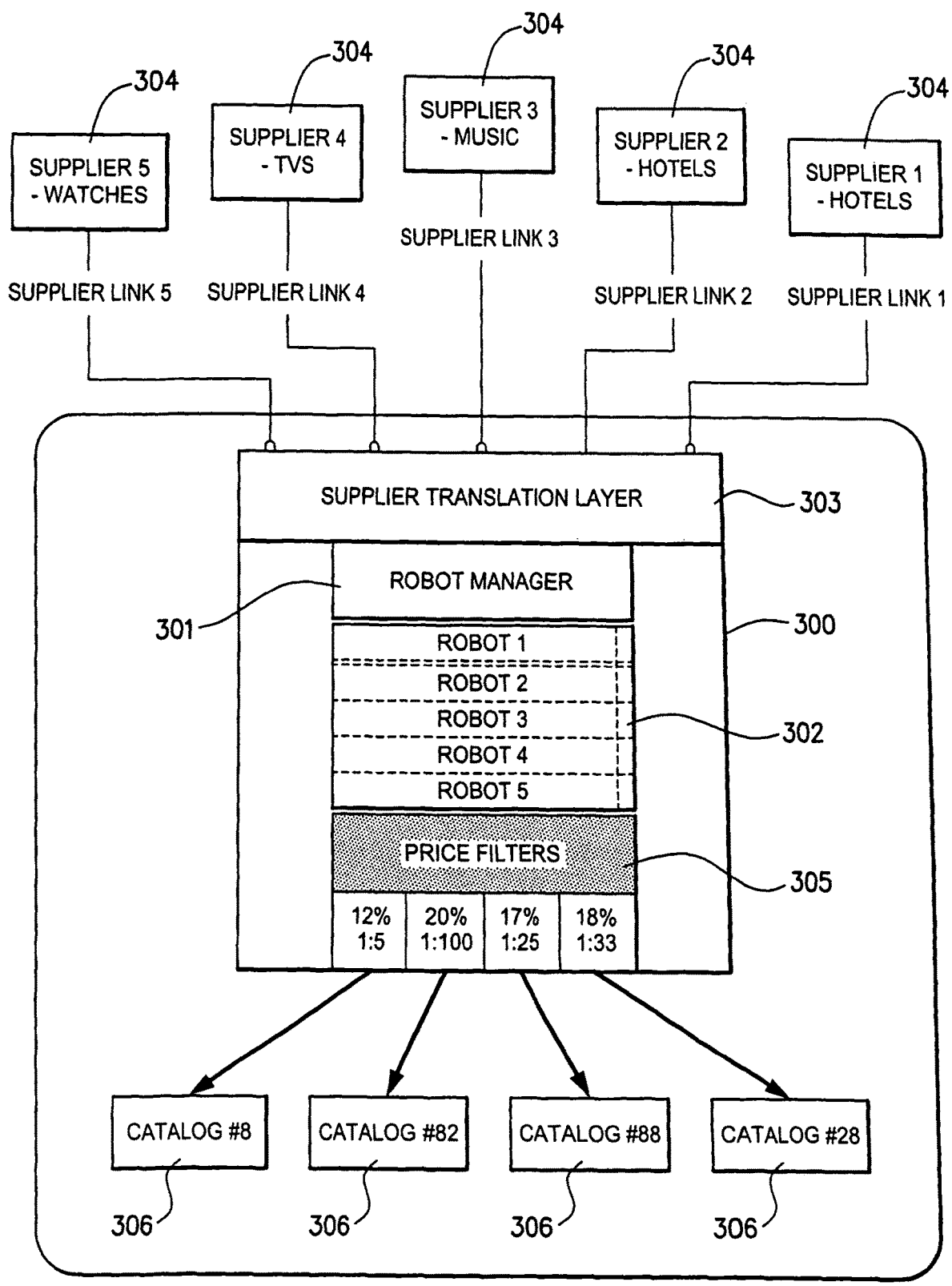
FIG. 7 is a schematic block diagram illustrating implementation of a controller in accordance with an embodiment of the present invention.

Referring to FIG. 7, the receiver and selector of the system may be implemented in this embodiment by a controller 300, as discussed above. The controller may by implemented by appropriate software and/or hardware provided by the product data provider system 21. In this embodiment, the controller 300 includes a robot manager 301 and is responsible for programming and initiation of robots 302 for implementing the selection criteria. The robots have the functionality and may be implemented as discussed above.

In this example, the controller also controls a receiving interface 303 between the supplier data (from suppliers 304) and the robots 302. The receiver interface 303 is in this embodiment in the form of a translation layer 303 which translates data from the suppliers 304 to a format which is suitable for the processing by the robots 302. The robots generally work on a single data format, and suppliers may have various data formats so that the translation 303 is required.

In this example, the controller 300 also implements the virtual currency converter in the form of the price/points filters 305. Price/points filters 305 may have the functionality discussed above. The price/points filters output to the catalog 306.

Figure 8:
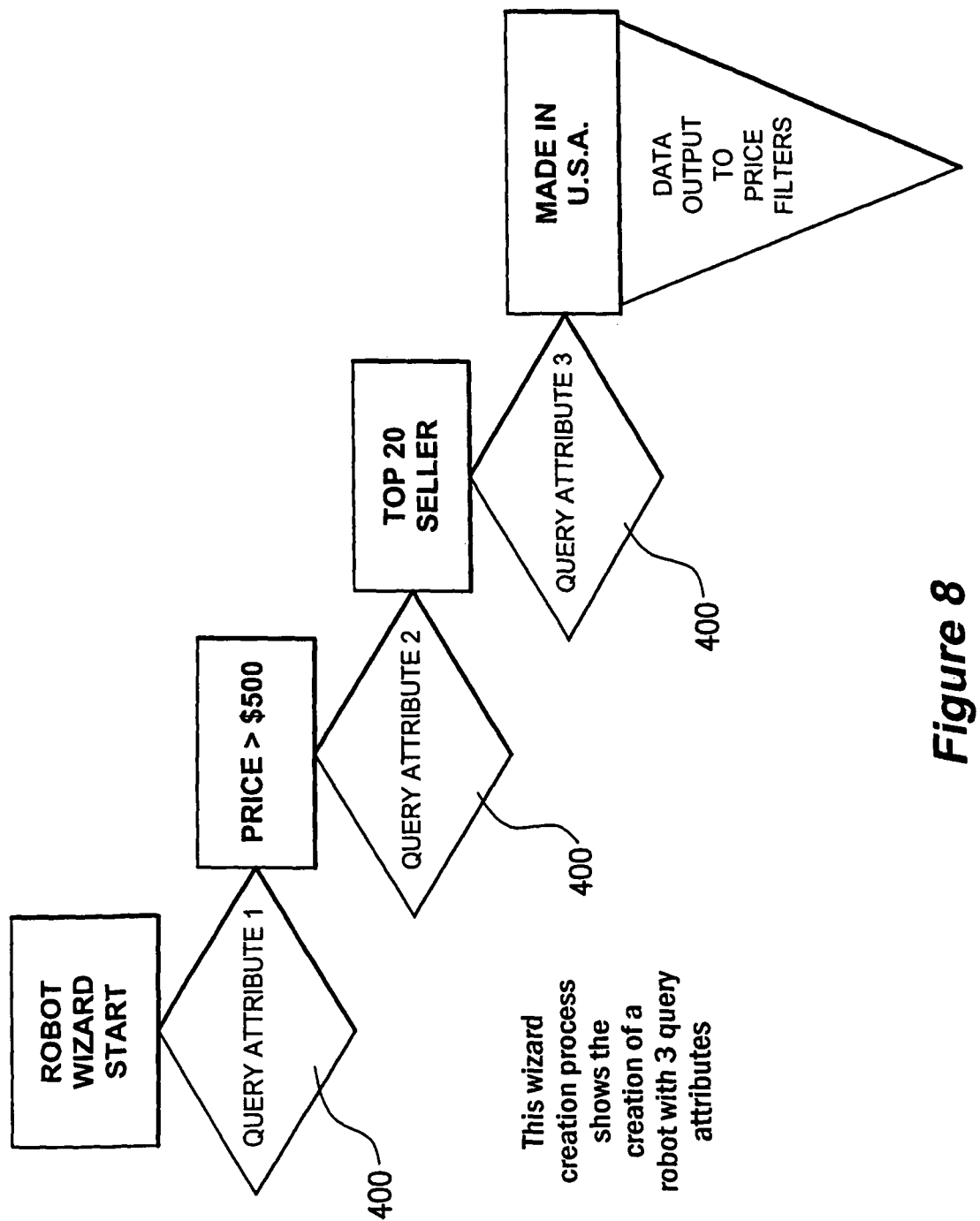
FIG. 8 is a diagram illustrating operation of a search query generator of a system in accordance with an embodiment of the present invention.

The controller also comprises a search query generator, which in this embodiment is a "wizard" which a user can utilize to implement search queries and set up the robots. Referring to FIG. 8, a high level schematic view of the search query generator process is illustrated. The wizard essentially enables a user to enter query attributes 400 which defined the search queries that are to be implemented by the robots. Once the wizard has been completed the robots are configured. A scheme promoter may have access to the wizard in order to develop search queries.

In an embodiment, the controller may also be able to provide "alarms" when the system is awry or when it is receiving data that is awry. In an embodiment the controller can send a notification (via email, SMS or any communication means) to the scheme promoter or system administrator if certain events occur. For example, if a required number of items cannot be found from a supplier, or if a robot could not communicate with a supplier for data, then an alarm may be sent. Further if an unusual event occurs, such as a large price change occurs (e.g. 50% or 100%) which doesn't seem to be appropriate, an alarm may also be sent. Alarm parameters may be preset.

It will be appreciated that many search robots may be implemented with system in accordance with this invention. In one embodiment, robots may be classified in "items sets". Each catalog may be provided with their own search robots enabling automatic updates to the product mix and/or price of products or services within the catalog. The search robots can be aggregated into item sets. The item sets may carry metadata which describes the relationship between the robots. For example a "travel and vacation" item set may contain search robots for hotel stays, surf boards, event tickets, and luggage. Other item sets of robots may be provided to populate catalogs of different types.

In the above embodiment, the selector and receiver are implemented by a controller which includes a supplier translation layer, a robot manager implementing search robots and price/points filters implementing the virtual currency converter. The receiver and selector are not limited to this architecture. Other arrangements which may implement a selector implementing selection criteria for the catalogs may fall within the scope of the present invention. Any receiver able to receive supplier data falls within the scope of the present invention.

The above description relates to an embodiment for generating catalogs associated with loyalty and incentive schemes. The invention is not limited to use with loyalty and incentive schemes and may be implemented in other embodiments for any catalog system or any promotion requiring a catalog to be provided.

The above described embodiment relates to an Internet/Web based system. The invention is not limited to the Internet and Web. Implementation may be by way of mobile technology platform or any appropriate architecture. Where communication is via a network the network may be any appropriate network.

In the above described embodiment, the supplier data is aggregated into a supplier data feed from which a selection means operates to select product data for the catalog(s). The present invention is not limited to obtaining the product data from a feed of supplier data. The data may be obtained directly from each of the one or more suppliers. For example, the selection means may, where it utilises search robots, have the search robots separately review the data from each product supplier and that data is then provided directly to the catalogs.

In the above embodiment, data is obtained from a plurality of providers. In an alternative embodiment, only one provider may provide the data. The present invention is not limited to a plurality of providers. One provider may provide the data to one or more catalogs.

Modifications and variations as would be apparent to a skilled addressee are deemed to be within the scope of the present invention.

The invention claimed is:

1. A computer implemented system for creating and maintaining a plurality of online catalogs, the computer implemented system comprising:
a receiver interface configured to receive product provider data from a plurality of product provider Web systems over a network via a data feed configured to continually receive product provider data, wherein the receiver interface comprises a translation layer configured to translate product provider data into a format suitable for robotic processing;
a search query generator configured to generate a plurality of search queries for searching the product provider data in the format suitable for robotic processing for product data conforming with predefined selection criteria for each catalog, the predefined selection criteria being based on attributes of products associated with the product provider data in the format suitable for robotic processing;
a plurality of search robots, wherein the plurality of search robots implement the predefined selection criteria by accessing the product provider data in the format suitable for robotic processing and wherein the plurality of search robots further implement the search queries;

a robot manager configured to select the product provider data in the format suitable for robotic processing and update product data for each of the plurality of online catalogs and continually operating to maintain the plurality of online catalogs by:
  (i) adding predefined combinations of the selection criteria to the plurality of search robots to implement the plurality of search queries;
  (ii) identifying product data from the product provider data in the format suitable for robotic processing that matches the search criteria implemented by the plurality of search queries; and
  (iii) identifying product data from the product provider data in the format suitable for robotic processing that no longer matches the search criteria implemented by the plurality of search queries;
a processor configured to provide and update product data in the plurality of online catalogs by:
  (i) selecting a unique set of catalog items for inclusion in each of the plurality of online catalogs;
  (ii) selecting a unique set of catalog items for removal in each of the plurality of online catalogs;
  (iii) selecting a unique set of catalog items for updating in each of the plurality of online catalogs; and
  (iv) simultaneously modifying a plurality of product catalog databases by adding catalog items with product data identified as matching the search criteria implemented by the plurality of search queries, removing catalog items with product data identified as no longer matching the search criteria implemented by the plurality of search queries, and modifying catalog items with product data identified as being updated based the search criteria implemented by the plurality of search queries,
wherein the plurality of product catalog databases are dynamically modified in an ongoing manner with catalog specific product data generated based on filters associated with the individual product catalog databases, the filters being created by the plurality of search robots implementing the plurality of search queries and price filters arranged to adjust the product data after it has been selected, to adjust price data associated with the product data; and
wherein each of the plurality of online catalogs comprises at least one filter, the at least one filter being applied to the data in the associated online catalog to modify the product data in the manner defined by the at least one filter and such that the product data for the same catalog items in each of the plurality of online catalogs is modified in a different manner.

2. A system in accordance with claim 1, wherein the selection criteria comprises one or more of the following; product price; consumer rating; product category; location of manufacture; geographic availability; date of availability; currency; product popularity; product availability; season; product type; product brand; destination (travel product); travel date range (travel product); value (based on difference between suggested retail price and sale price).

3. A system in accordance with claim 1, wherein each product associated with product data is allocated a virtual currency value, and wherein the virtual currency value may be different for the same product in different catalogs.

4. A system in accordance with claim 1, comprising a virtual currency converter arranged to convert currency values of products to virtual currency points in accordance with a points conversion rate.

5. A system in accordance with claim 1, further comprising a order and reconciliation facility, which is arranged to receive and process orders from participants.

6. A system in accordance with claim 5, wherein the order and reconciliation means may include means enabling redemption of a product using a combination of virtual currency and actual currency.

7. A system in accordance with claim 1, comprising a facility for calculating a mark-up on the price of a product and providing the price at a marked-up level to the catalog.

8. A system in accordance with claim 1, wherein each of the plurality of product catalogs is associated with two or more search robots providing product data.

9. A system in accordance with claim 1, wherein each of the plurality of respective catalogs is associated with its own respective selection criteria implemented by one or more robots associated with each respective catalog.

10. A system in accordance with claim 1, wherein the product provider data comprises data on different product data types, and wherein the plurality of search robots is arranged to populate each respective catalog with a respective one of the product data types.

11. A system in accordance with claim 1, wherein the plurality of search robots is arranged to select data for the catalogs so that each catalog contains a subset of data obtained from a plurality of different product provider computer systems.

12. A system in accordance with claim 1, wherein the price filters are arranged to select product data to go to catalogs in dependence on price associated with the product data.

* * * * *